3,113,950
PROCESS FOR THE PREPARATION OF CYCLO-
HEPTA[b]PYRROL-8(1H)-ONE DERIVATIVES
Genshun Sunagawa and Nobuo Soma, both of Tokyo,
Japan, assignors to Sankyo Company, Limited, Tokyo,
Japan
No Drawing. Filed May 2, 1961, Ser. No. 107,031
Claims priority, application Japan May 6, 1960
4 Claims. (Cl. 260—326.3)

This invention relates to a process for preparing cyclohepta[b]pyrrol-8(1H)-one derivatives. More particularly, it relates to a process for preparing cyclohepta[b]pyrrol-8(1H)-one derivatives having the general formula

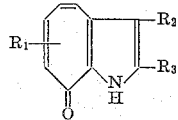
(I)

In the above-mentioned general formula, $R_1$ represents a member selected from the group consisting of hydrogen atom, halogen atom such as chlorine or bromine, nitro and alkyl radicals containing 1 to 5 carbon atoms such as methyl, ethyl, propyl or isopropyl radical, $R_2$ represents a member selected from the group consisting of alkoxycarbonyl radicals such as methoxycarbonyl, ethoxycarbonyl or propoxycarbonyl radical and acyl radicals containing 2 to 5 carbon atoms such as acetyl, propionyl or butyryl radical and $R_3$ represents a lower alkyl radical containing 1 to 5 carbon atoms when $R_2$ is the acyl radical and represents a member selected from the group consisting of lower alkyl radicals containing 1 to 5 carbon atoms and alkoxycarbonylalkyl radicals such as methoxycarbonyl methyl, ethoxycarbonyl methyl or ethoxycarbonylethyl radical when $R_2$ is the alkoxycarbonyl radical.

The cyclohepta[b]pyrrol-8(1H)-one derivatives having the above-described Formula I produced according to the process of this invention are novel compounds unknown in the prior arts and useful as intermediates for the preparation of various compounds valuable as medicinals. For example, a cyclohepta[b]pyrrol-8(1H)-one derivative of the above-described Formula I, namely, 2-methyl - 3 - carbethoxycyclohepta[b]pyrrol - 8(1H)-one, may be converted to cyclohepta[b]pyrrol-8(1H)-one derivatives having the general formula

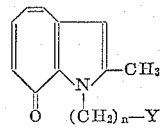

wherein Y is a di-(lower alkylamino) radical such as dimethylamino or diethylamino radical and $n$ is an integer from 1 to 5, which are valuable as the hypotensive agent, by successively subjecting the former to saponification and decarboxylation, reaction with an alkali-metal amide, hydride or alkoxide and reaction with a halogenoalkylamine.

It is an object of this invention to provide a process for preparing novel cyclohepta[b]pyrrol-8(1H)-one derivatives having the above-described Formula I useful as intermediates for the preparation of compounds valuable as medicinals.

According to the present invention, the above-mentioned cyclohepta[b]pyrrol-8(1H)-one derivatives may be produced by reacting 2-amino-3-halogenotropones having the general formula

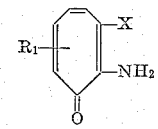
(II)

wherein $R_1$ has the same meaning as above and X is a halogen atom with active methylene compounds having the general formula $$R_4\text{---}CO\text{---}CH_2\text{---}R_5 \tag{III}$$

wherein $R_4$ is a member selected from the group consisting of alkoxy and lower alkyl radicals the latter containing 1 to 5 carbon atoms and $R_5$, when $R_4$ is the alkoxy radical, represents a member selected from the group consisting of acyl radicals containing 2 to 6 carbon atoms and radicals $CO(CH_2)_nCOR_6$ wherein $n$ is an integer from 1 to 5 and $R_6$ represents an alkoxy radical, and, when $R_4$ is the lower alkyl radical containing 1 to 5 carbon atoms, represents an acyl radical containing 2 to 5 carbon atoms.

In carrying out the reaction, alkali metals such as sodium or potassium, alkali metal hydrides such as sodium or potassium hydrides, alkali metal amides such as sodium or potassium amide and alkali metal alkoxides such as sodium ethoxide or potassium t-butoxide may be used as the condensing agent. The reaction is carried out in organic solvents such as alcohols, dioxane, benzene or toluene. It is preferable to carry out the reaction at temperatures at which the solvent used is refluxed or at temperatures between about 80° C. and about 110° C. in a sealed vessel. When the active methylene compound is used in the form of its alkali metal salt no condensing agent is required to exist.

After completion of the reaction, the reaction product is isolated from the reaction mixture by one of the conventional procedures. For example, after completion of the reaction the reaction mixture is concentrated, the concentrate is added to water followed by neutralization with mineral acid such as hydrochloric or sulfuric acid and then the precipitated product is isolated by filtration. Alternatively, after the neutralization with mineral acid as above the resulting mixture is extracted with water-immiscible organic solvents such as ether or benzene and the solvent is removed from the extract to give the desired product.

When the 2-amino-3-halogenotropones having the above-described general Formula II and the active methylene compound having the above-described Formula III in which $R_4$ represents an alkoxy radical and $R_5$ represents acyl radicals containing 2 to 6 carbon atoms or a radical $CO(CH_2)_nCOR_6$ are used as the reactants in carrying out the process according to the present invention, there are obtained cyclohepta[b]pyrrol-8(1H)-one derivatives having the above-described Formula I in which $R_2$ represents a carboalkoxy radical and $R_3$ represents a lower alkyl radical containing 1 to 5 carbon atoms or an alkoxycarbonylalkyl radical.

Examples of the 2-amino-3-halogenotropone starting material used in this case are 2-amino-3-bromotropone, 2 - amino-3-bromo-5-methyltropone, 2-amino-3-bromo-6-isopropyltropone, 2-amino-3,5-dibromo-tropone, 2-amino-3,5 - dibromo-6-isopropyltropone, 2-amino-3-chloro-4-isopropyltropone and the like.

Examples of the active methylene compound having the above-described Formula III in which $R_4$ represents an alkoxy radical and $R_5$ represents an acyl-radical containing 2 to 6 carbon atoms or a radical $CO(CH_2)_nCOR_6$ are diethyl acetonedicarboxylate

diethyl 3-oxoadipate

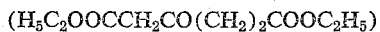

diethyl 3-oxopimerate

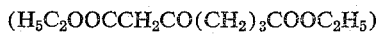

diethyl 3-oxosuberate

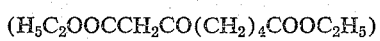

ethyl acetoacetate, ethyl propionylacetate, ethyl butyrylacetate, ethyl valerylacetate, ethyl caproylacetate and the like.

Examples of the cyclohepta[b]pyrrol-8(1H)-one produced is this case are 2-ethoxycarbonylmethyl-3-ethoxycarbonylcyclohepta[b]pyrrol-8(1H)-one,
2-ethoxycarbonylethyl-3-ethoxycarbonylcyclohepta[b]pyrrol-8(1H)-one,
2-ethoxycarbonylpropyl-3-ethoxycarbonylcyclohepta[b]pyrrol-8(1H)-one,
2-ethoxycarbonylbutyl-3-ethoxycarbonylcyclohepta[b]pyrrol-8(1H)-one,
2-methyl-3-ethoxycarbonylcyclohepta[b]pyrrol-8(1H)-one,
2-ethyl-3-ethoxycarbonylcyclohepta[b]pyrrol-8(1H)-one,
2-propyl-3-ethoxycarbonylcyclohepta[b]pyrrol-8(1H)-one,
2-butyl-3-ethoxycarbonylcyclohepta[b]pyrrol-8(1H)-one and
2-pentyl-3-ethoxycarbonylcyclohepta[b]pyrrol-8(1H)-one.

When the 2-amino-3-halogenotropone having the above-described Formula II and the active methylene compound having the above-described Formula III in which $R_4$ is a lower alkyl radical containing 1 to 5 carbon atoms and $R_5$ is an acyl radical containing 2 to 5 carbon atoms are used as the reactants in carrying out the process according to the present invention, there are obtained cyclohepta[b]pyrrol-8(1H)-one derivatives having the above-described Formula I in which $R_2$ represents an acyl radical containing 2 to 5 carbon atoms and $R_3$ represents a lower alkyl radical containing 1 to 5 carbon atoms.

Examples of the 2-amino-3-halogenotropone having the above-described Formula II used in this case are same as those described above.

Examples of the active methylene compound having the above-described Formula III in which $R_4$ represents a lower alkyl radical having 1 to 5 carbon atoms and $R_5$ represents an acyl radical having 2 to 5 carbon atoms are acetylacetone ($CH_3COCH_2COCH_3$), dipropionylmethane ($C_2H_5COCH_2COC_2H_5$), dibutyrylmethane

and the like.

Examples of the cyclohepta[b]pyrrol-8(1H)-one derivative having the above-described Formula I are 2-methyl-3-acetylcyclohepta[b]pyrrol-8(1H)-one,
2-ethyl-3-propionylcyclohepta[b]pyrrol-8(1H)-one,
2-propyl-3-butyrylcyclohepta[b]pyrrol-8(1H)-one and the like.

Examples of this invention are illustrated below. However, it is to be understood that these examples are given for illustration but not for limitation of the scope of this invention.

*Example 1*

To a solution of 0.4 g. of metallic potassium in 20 cc. of t-butanol are added 2.1 g. of diethyl acetonedicarboxylate and 1.0 g. of 2-amino-3-bromotropone. The mixture is heated in a sealed tube at 100–105° C. for 6 hours. After cooled, the crystals precipitated are separated by filtration and the filtrate is concentrated under reduced pressure. To the residue is added water and pH of the mixture is adjusted to 9.5 to precipitate crystals. The crystals are separated by filtration and recrystallized from ethanol to give 350 mg. of white needles melting at 169–170° C., which is 2-ethoxycarbonylmethyl-3-ethoxycarbonylcyclohepta[b]pyrrol-8(1H)-one.

*Example 2*

To a solution of 0.23 g. of metallic sodium in 10 cc. of ethanol are added 1.0 g. of acetylacetone and 1.0 g. of 2-amino-3-bromotropone. The mixture is heated in a sealed tube at 95° C. for 2 hours. After cooling the crystals precipitated are separated by filtration and the filtrate is concentrated under reduced pressure. To the residue is added water and the mixture is made acid with hydrochloric acid and then the crystals precipitated is filtered off. The filtrate is washed with ether and treated with sodium carbonate to pH 6.0. The resulting mass is extracted with ether and the extracted is concentrated by evaporation of the ether. The residual crystals are recrystallized from ethanol to give 0.2 g. of white plate melting at 213–214° C., which is 2-methyl-3-acetylcyclohepta[b]pyrrol-8(1H)-one.

*Example 3*

To a solution of 0.58 g. of metallic potassium in 20 cc. of t-butanol are added 1.95 g. of ethyl acetoacetate and 1.5 g. of 2-amino-3-bromotropone. The mixture is heated on a steam bath for 6 hours. Concentration of the reaction mixture under reduced pressure and addition of water followed by addition of hydrochloric acid to pH 5.5 give crystals precipitated. The crystals are separated by filtration and washed with acetone to give 1.0 g. of white crystals. Recrystallization of the crystals from ethanol gives white capillar crystals melting at 183° C., which is 2-methyl - 3 - ethoxycarbonylcyclohepta[b]pyrrol-8(1H)-one.

We claim:
1. Process for the preparation of a compound having the formula

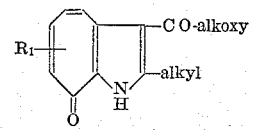

wherein $R_1$ represents a member selected from the group consisting of hydrogen, halogen, nitro and lower alkyl of 1 to 5 carbon atoms, alkyl stands for alkyl of 1 to 5 carbon atoms and alkoxy stands for alkoxy of 1 to 3 carbon atoms which comprises reacting a compound having the formula

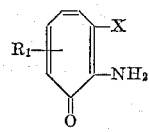

wherein $R_1$ is same as above and X represents halogen with a compound having the formula alkoxy-CO—CH$_2$-acyl wherein acyl represents a member selected from the group consisting of acetyl, propionyl, butyryl, valeryl and caproyl and alkoxy has the above meaning in an organic solvent in the presence of a condensing agent selected from the group consisting of alkali metals and alkali metal hydrides, amides and alkoxides.

2. Process for the preparation of a compound having the formula

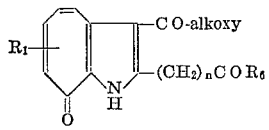

wherein $R_1$ represents a member selected from the group consisting of hydrogen, halogen, nitro and lower alkyl of 1 to 5 carbon atoms, $n$ is an integer from 1 to 5 and $R_6$ and alkoxy represents alkoxy of 1 to 3 carbon atoms which comprises reacting a compound having the formula

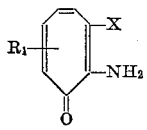

wherein $R_1$ is same as above and X represents halogen with a compound having the formula

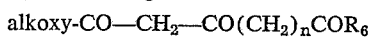

wherein $n$, $R_6$ and alkoxy are same as above in an organic solvent in the presence of a condensing agent selected from the group consisting of alkali metals and alkali metal hydrides, amides and alkoxides.

3. A compound of the formula

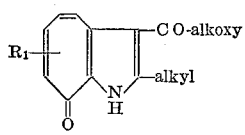

wherein $R_1$ represents a member selected from the group consisting of hydrogen, halogen, nitro and lower alkyl of 1 to 5 carbon atoms, alkyl stands for alkyl of 1 to 5 carbon atoms and alkoxy stands for alkoxy of 1 to 5 carbon atoms.

4. A compound of the formula

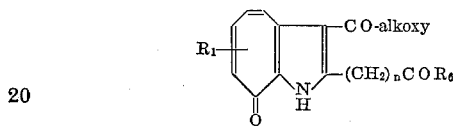

wherein $R_1$ represents a member selected from the group consisting of hydrogen, halogen, nitro and lower alkyl of 1 to 5 carbon atoms, $n$ is an integer 1 to 5 carbon atoms and alkoxy stands for alkoxy of 1 to 3 carbon atoms.

No references cited.